United States Patent Office 3,542,904
Patented Nov. 24, 1970

3,542,904
COMPOSITION WITH ANTISTATIC PROPERTIES COMPRISING GRAFT COPOLYMER AND A POLYPROPYLENE GLYCOL
Hans Weitzel and Harold Ebneth, Leverkusen, and Karl Dinges and Karl-Heinz Ott, Cologne-Stammheim, Germany, assignors to Farbenfabriken Bayer Aktiengesellschaft, Leverkusen, Germany, a corporation of Germany
No Drawing. Continuation of application Ser. No. 563,860, July 7, 1966. This application Mar. 17, 1969, Ser. No. 808,388
Claims priority, application Germany, Aug. 6, 1965, F 46,817
Int. Cl. C08f 15/18, 19/18
U.S. Cl. 260—876
7 Claims

ABSTRACT OF THE DISCLOSURE

Reduction of antistatic properties of graft copolymers of styrene and acrylonitrile grafted on a copolymer of butadiene and an ester of an ethylenically unsaturated carboxylic acid and an alkanol by the addition of a propylene glycol having a degree of polymerization from 5 to 1,000.

---

This application is a streamlined continuation of application Ser. No. 563,360 filed July 7, 1966. This invention relates to moulding compositions which are based on thermoplastic graft-copolymer mixtures exhibiting outstanding antistatic properties.

One advantage of known thermoplastic moulding compositions based on graft-copolymer mixtures of butadiene, acrylic or methacrylic esters, styrene and acrylonitrile is that they combine high impact and notched impact strength with outstanding hardness and tensile strength. Unfortunately, these known materials have an extremely high electric surface resistance which has an unfavourable effect on their electrostatic behaviour. For example, consumer goods manufactured from these moulding compositions show a tendency to attract dust very quickly and, for this reason, are not at all suitable for many purposes.

There are already a number of processes for preventing or reducing the electrostatic charging of thermoplastic moulding compositions, such as cellulose acetate and cellulose propionate. For example, mouldings made from materials such as these can be exposed to air saturated with moisture. Due to absorption of water vapour, the surface resistance of these mouldings is reduced to such a considerable extent that they cannot become dusty or soiled. The major disadvantage of this method is that, when left standing in dry air, the mouldings very quickly lose their initially outstanding antistatic properties.

An alternative method of reducing electrostatic charging, for example in the case of polyolefins, comprises after-treating the surface of mouldings made from such materials with antistatic agents and inhibiting electrostatic charging by the formation of a conductive film. This method has the two-fold disadvantage that the film thus formed is very quickly rubbed off or worn through when the moulding is in use, and that the antistatic agent used is often extremely hygroscopic and thus has a highly detrimental effect on the surface of the moulding. In addition, the antistatic agent is often physiologically unacceptable.

Furthermore it has already been proposed to introduce substances with an antistatic action into the thermoplastic moulding compositions before they are worked. Examples of such substances include amines, amides, salts of quaternary ammonium bases, sulphonic acids, aryl-alkyl sulphonates, acids of phosphorus, aryl-alkyl phosphates, polyglycols and their derivatives, fatty acid esters of polyglycols, aryl and alkyl esters of polyglycols and even polyalcohols. In order to provide an adequate antistatic effect, however, these substances have to be introduced in such large quantities that the mechanical properties of the mouldings produced from such a material no longer satisfy standard requirements. In other words, it is impossible to avoid a substantial decrease in hardness, stiffness and thermal stability under load.

The antistatic action of all these known antistatic substances can ultimately be attributed to the formation, over the surface of the moulding, of a film of moisture which improves surface conductivity.

According to French patent specification No. 1,250,926, polyalkylene glycols with a molecular weight of between 200 and 1200 are added as antistatic agents to mouldings produced from polyolefins, to prevent them from becoming electrostatically charged. Unfortunately, the polyalkylene glycols used, which are added in a concentration of between 0.01 and 0.5% by weight, only produce an adequate effect in cases where their solubility in water is at least 0.5 g. per 100 g. of water, measured at a temperature of 25° C. Consequently moulding compositions whose electrostatic charging is reduced by the addition of such water-soluble polyalkylene glycols (due to the formation of a superficial film of water) lose their antistatic properties when mouldings produced from them come into contact with water or moisture for prolonged periods, as frequently happens in practice.

It is also known (cf. Belgium patent specification No. 650,391) that thermoplastically mouldable synthetics exhibiting good antistatic properties can be produced by working polypropylene glycols which are practically insoluble in water into graft-copolymer mixtures of elastomeric graft polymers of styrene and acrylonitrile on polybutadiene and thermoplastic styrene/acrylonitrile copolymers.

It has now surprisingly been found that moulding compositions exhibiting considerably improved antistatic properties can be obtained by adding small quantities of polypropylene glycols, whose terminal hydroxyl groups may optionally be etherified or esterified, to a graft copolymer the graft base of which comprises a copolymer of a diene and an ester of an ethylenically unsaturated carboxylic acid, and the grafting monomer of which comprises a mixture of styrene and acrylonitrile or their alkyl derivatives, in which case only a part of the styrene/acrylonitrile mixture must be grafted on.

Esters of ethylenically unsaturated carboxylic acids suitable for the preparation of the graft base are, in particular, esters of acrylic acid, methacrylic acid and/or fumaric acid. The alkyl group in the ester is preferably derived from an aliphatic alcohol with 1 to 10 carbon atoms.

Polypropylene glycols suitable for the process of the invention are polypropylene glycols practically insoluble in water or ethers or esters derived from them, in which cases the degree of polymerisation of these compounds is advantageously from 5 to 1000, preferably 10 to 200. If esters or ethers are used, they are preferably derived from aliphatic alcohols with 1 to 20 carbon atoms or carboxylic acids with 1 to 18 carbon atoms.

Dienes suitable for the process are, in particular butadiene and isoprene, although other dienes can also be used.

The antistatic effect of these polypropylene glycols and their derivatives is obviously not due to the formation of a film of water over the surface of the mouldings produced from the material, as is the case with other antistatic agents. Even when the mouldings are stored in water, the antistatic additives according to the invention are not dissolved out, because of their insolubility in water.

Preferred thermoplastic moulding compositions according to the invention with antistatic properties comprises:

(A) 5 to 99% by weight, preferably 5 to 60% by weight of a graft copolymer prepared by the graft polymerisation of:
    (a) 10 to 95% by weight, preferably 10 to 80% by weight, of a mixture of:
        (1) 50 to 90% by weight of styrene, and
        (2) 50 to 10% by weight of acrylonitrile, in which case both these components may be completley or partially replaced by their respective alkyl derivatives on
    (b) 90 to 5% by weight, preferably 90 to 20% by weight, of a copolymer of:
        (1) 85 to 5% by weight, preferably 85 to 15% by weight, of a conjugated diolefin, and
        (2) 15 to 95% by weight, preferably 15 to 85% by weight, of an ester of an ethylenically unsaturated carboxylic acid;

(B) 0 to 94% by weight, preferably 10 to 92% by weight of a thermoplastic copolymer of
    (a) 50 to 95% by weight of styrene
    (b) 50 to 5% by weight of acrylonitrile, or the alkyl derivatives of these two monomer components, in which case the total quantity of acrylonitrile and sytrene or their alkyl derivatives in the components A and B, must not be lower than 50% by weight, and (C) 1 to 10% by weight of a polypropylene glycol whose degree of polymerisation is at least 5 and at most 1000 and whose terminal OH— groups may be completely or partly etherified or esterified.

It is apparent from the foregoing that the resin-forming monomers (i.e., for example styrene and acrylonitrile) are, preferably, grafted partly on to the graft base and partly blended in the form of a copolymer B with the graft polymer component A. The preferred ratio of grafted styrene/acrylonitrile to mixed styrene/acrylonitrile, is given above. In principle, however, it is also possible to graft al the resin-forming monomers on to the graft base.

In either case, however, the total quantity of acrylonitrile and styrene must make up at least 50% by weight of the total polymer.

In a preferred embodiment of the invention, the graft base, i.e., the copolymer of a conjugated diolefin with an ester of an unsaturated carboxylic acid, comprises a butadiene/acrylate or butadiene/methacrylate copolymer.

According to one modification of the process according to the invention, the butadiene in the graft base may even be replaced by mixtures of butadiene with isoprene or other dienes. On one preferred embodiment, the acrylate or methacrylate in the graft base are esters of acrylic acid or methacrylic acid with alcohols containing 1 to 10 carbon atoms, and may be used either individually or in admixture with one another.

According to another modification of the process according to the invention, the acrylates or methacrylates in the graft base may be completely or partly replaced by fumarates, i.e., esters of fumaric acid with alcohols containing 1 to 10 carbon atoms.

It is, in addition, possible in principle to add, during preparation of the graft base of the polymerisation component A by polymerising butadiene with acrylates, methacrylates and/or fumarates, small quantities of mixtures of cross-linking agents with two double bonds, for example, divinyl benzene, ethylene glycol diacrylate or butane diol diacrylate, and other compounds which can be polymerised under the influence of free radicals with butadiene and the acrylates, methacrylates and/or fumarates, for example styrene, acrylonitrile or methyl vinyl ether.

In addition, the components, styrene and acrylonitrile, to be grafted on the graft base of graft polymerisation component A, may be completely or partly replaced by alkyl derivatives of these compounds, in particular α-methylstyrene, nuclear-alkylated styrenes or methacrylonitrile.

In another preferred embodiment, a thermoplastic copolymer of styrene and acrylonitrile with a K-value (according to Fikentscher, Cellulosechemie, 13 (1932), 58) of at least 45, preferably from 55 to 80, is used as copolymerisation component B.

Similarly, the styrene and acrylonitrile in the thermoplastic copolymerisation component B may be completely or partly replaced by alkyl derivatives of these components, in particular α-methylstyrene and/or nuclear-alkylated styrenes or methacrylonitrile. Particularly advantageous in this respect are, above all, thermoplastic copolymers comprising 95 to 60% by weight of styrene and 5 to 40% by weight of acrylonitrile, in whose case the styrene may be completely replaced by α-methylstyrene.

For the purpose of this invention, component C comprises polypropylene glycols which have a degree of polymerisation of at least 5 and at most 1000 and of which the terminal OH— groups may be completely or partly etherified or esterified, in which case alcohols with 1 to 20 carbon atoms are used as the ether-forming alcohol component and monocarboxylic acids with 1 to 18 carbon atoms as the ester-forming acid component. Branched or linear polypropylene glycols and polypropylene glycols whose polypropylene glycol chain is interrupted by ester groups, may be used. In one preferred embodiment of the present invention, fully linear polypropylene glycols with a degree of polymerisation of at least 10 and at the most 200 are used as component C.

Graft copolymerisation component A may be prepared as known per se by polymerising the monomers to be grafted on in the presence of the graft base, for example by emulsion polymerisation, suspension polymerisation solution polymerisation or by precipitation polymerisation. Graft polymerisation is advantageously carried out in emulsion in cases where the copolymer of the 1,3-diolefin with acrylates, methacrylates and/or fumarates used as the graft base, is already in the form of an emulsion.

The regulators, polymerisation catalysts, electrolytes, etc. described in the preparation of B, may in principle be used in the quantities specified.

Suitable emulsifiers are, for example, alkylsulphates with 10 to 20 carbon atoms, alkyl sulphonates with 10 to 20 carbon atoms or reaction products of ethylene oxide with long-chain fatty alcohols or phenols.

The thermoplastic copolymerisation component B may also be prepared as known per se by emulsion polymerisation, suspension polymerisation, solution polymerisation or by precipitation polymerisation. Component B is also preferably polymerised in aqueous emulsion, in which case the usual quantities of water, emulsifiers, regulators, polymerisation catalysts, pH-regulators and other additives, may be used. The monomer or polymer concentration is, for example, 20 to 50% by weight, i.e., 400 to 100 parts by weight of water are used per 100 parts by weight of monomer.

Examples of suitable emulsifiers are the sodium, potassium or ammonium salts of long-chain fatty acids with 10 to 20 carbon atoms, alkyl sulphates with 10 to 20 carbon atoms, alkyl sulphonates with 10 to 20 carbon atoms, rosin acids (e.g., derivatives of abietic acid) and reaction products of ethylene oxide with long-chain fatty alcohols or phenols. Emulsifiers which have no emulsifying action below pH 7 due to the formation of free acids, are preferably used.

Long-chain mercaptans, such as dodecyl mercaptan, may for example, be used to regulate the molecular weight and hence to provide the required K-value.

Suitable polymerisation catalysts include inorganic or organic peroxy compounds or azo compounds, for example, potassium or ammonium persulphate, tert.-butyl hydroperoxide, cumene hydroperoxide, tert.-butyl perbenzoate, isopropyl percarbonate and azodiisobutyronitrile. It is also possible to use Redox systems consisting of the aforementioned peroxy compounds and reducing agents, for example, sodium pyrosulphite or bisulphite, sodium formaldehyde sulphoxylate, triethanolamine and tetra-ethylene pentamine.

Salts of orthophosphoric acid or pyrophosphoric acid may for example be used as pH-regulators. Polymerisation may be carried out at pH-values from 2 to 11, and at temperatures in the range from 20 to 100° C., preferably from 40 to 90° C.

In principle, the polypropylene glycols may be added to the copolymer components and the elastomeric graft copolymer components used in accordance with the invention, in any one of several different ways:

(1) The polypropylene glycol may be mixed with the coagulate of the latex mixture of components A and B in which case the polyether itself is absorbed fairly satisfactorily even in the presence of water.

(2) The polypropylene glycols may be worked into the dry powder of the copolymer mixture, preferably along with pigments, etc. by means of suitable mixers, for example, single- or twin-screw extruders or Banbury mixers.

(3) In one preferred embodiment of the present invention, an emulsion of the polypropylene glycol (as illustrated hereinafter) is mixed, preferably at room temperature, with a mixture of the latices of components A and B, and the resulting mixture is substantially coagulated as known per se. It has proved to be of particular advantage to use ultra-finely-divided polypropylene glycol emulsions.

The polypropylene glycol emulsion may be prepared by stirring the particular polyether into an aqueous emulsifier solution by means of a high-speed stirred. The quantities of water to be used are preferably 0.5 to 2 parts of water to 1 part of polyether. Suitable emulsifiers are those used in the preparation of the graft polymer and styrene-acrylonitrile copolymer (see above). They are preferably used in quantities from 0.5 to 5% by weight, based on the polypropylene glycol. The mixtures may be coagulated by methods known per se, comprising mixing the latex/polyether mixture with electrolytes, particularly inorganic salts or acids, and optionally heating the resulting mixture at elevated temperature. The type of coagulant used will depend upon the emulsifier present in the mixture. Electrolytes, for example sodium chloride, calcium chloride, magnesium sulphate or aluminum sulphate, will mainly be used in the presence of agents with an emulsifying action both in the acid and in the alkaline range (alkyl sulphates and sulphonates). In the case of emulsifiers which are inactive in the acid range, it will be sufficient to add an acid, for example hydrochloric acid or acetic acid, to bring about coagulation.

It is also possible to coagulate the mixture by cooling it to temeperatures below 0° C. ('Freezing out').

The coagulates may be worked up by methods known per se for working up coagulates of thermoplastic copolymer mixtures, i.e., by isolating the coagulates, washing them until they are free from electrolyte and thus neutral, and drying them at a temperature below 100° C., preferably in vacuo.

The dried material is then compacted or consolidated and homogenised on mixing rolls, kneaders or similar mixers, at temperatures in the range from 130° C. to 180° C., and if desired may be subsequently granulated. The resulting, compact compositions which are stabilized both to heat and to light, may be subjected to conventional shaping or forming processes on the usual machines, for example, injection-moulding machines or extruders.

It is also possible to incorporate the conventional fillers, pigments and lubricants, for example stearates or waxes, in the thermoplastic moulding compositions obtained by the process according to the invention.

The thermoplastic moulding compositions prepared with a graft base comprising a copolymer of butadiene with acrylate, methacrylates and/or fumarates, are distinguished from moulding compositions in which a butadiene homopolymer was used as the graft base in the preparation of the graft copolymerisation component A, in that, when combined with polypropylene glycols, they surprisingly exhibit considerably improved antistatic properties.

The parts and percentages indicated in the following examples are always parts and percentages by weight.

EXAMPLE 1

5340 g. of a 32.8% latex of a graft polymer of 36 parts of styrene and 14 parts of acrylonitrile on 50 parts of a copolymer of 50% butadiene and 50% butyl acrylate, are mixed with 7940 g. of a 43.4% latex of a copolymer of 72 parts of styrene and 28 parts of acrylonitrile with a K-value of 60.3 and 834 g. of 30% emulsion of a linear polypropylene glycol with an average degree of polymerisation of 37±2 and an OH-number of 56±3. The ratio of graft polymer to resin to polypropylene glycol is thus 35:65:5. The resulting polymer/polyether mixture is coagulated with 2% calcium chloride solution and the coagulate is separated off, washed free from salts and dried in vacuo at 70 to 80° C.

The dried material is consolidated and homogenised on mixing rolls heated to 165° C., drawn off into strips and granulated in a beater mill. The granulate is injection-moulded into circular discs from which the data given in Table 1 were determined.

EXAMPLE 2

5070 g. of a 34.5% latex of a graft polymer of 14 parts of styrene and 6 parts of acrylonitrile on 80 parts of a copolymer of 50% butadiene and 50% methyl methacrylate, are mixed with 7490 g. of a 43.4% latex of a copolymer of 72 parts of styrene and 28 parts of acrylonitrile with a K-value of 60.3 and 834 g. of a 30% emulsion of a linear polypropylene glycol with an average degree of polymerisation of 37±2 and an OH-number of 56±3. The ratio of graft copolymer to resin to polypropylene glycol is thus 35:65:5. The polymer/polyether mixture was worked up and further processed as described in Example 1.

The electrical data measured on the circular discs are given in Table 1.

COMPARISON EXAMPLE A 5800 g. of a 30.2% latex of a graft polymer of 36 parts of styrene and 14 parts of acrylonitrile on 50 parts of polybutadiene, are mixed with 7490 g. of a 43.4% latex of a copolymer of 72 parts of styrene and 28 parts of acrylonitrile with a K-value of 60.3 and 834 g. of 30% aqueous emulsion of a linear polypropylene gylcol with an average degree of polymerisation of 37±2 and an OH-number of 56±3. The ratio of graft polymer to resin to polypropylene glycol is thus 35:65:5. The resulting polymer/polyether mixture is coagulated with 2% acetic acid and the coagulate is separated off, washed neutral and dried in avcuo at 70 to 80° C. The polymer mixture is further processed as in Example 1, and exhibits the electrical data given in Table 1.

The mixture was worked up and further processed as in Example 1. The resulting moulding composition showed the electrical data given in Table 2.

TABLE 1

[A comparison between the polymer/polyether mixtures according to the invention and a mixture of polyether with a copolymer whose graft base consist of a butadiene homopolymer]

| Graft polymer | | Copolymer component | Polyether component | Surface resistance, Ω | Rubbing partner polycaprolactam | | Rubbing Partner polyacrylonitrile | |
|---|---|---|---|---|---|---|---|---|
| | Graft base | Component | | | | Limiting charge, v. cm.⁻¹ | Half-value time, secs. | Limiting charge, v. cm.⁻¹ | Half-value time, secs. |
| Example 1 | Butadiene-butyl acrylate (50:50) | 35 | 65 | 5 | 2.10¹³ | −300 | 25 | +650 | 30 |
| Example 2 | Butadiene-methyl methacrylate (50:50) | 35 | 65 | 5 | 7.10¹² | −1,300 | 16 | +510 | 21 |
| Comparison Example A | Butadiene | 35 | 65 | 5 | 4.10¹³ | +1,400 | 550 | +1,600 | 730 |

NOTE.—Comparison of Examples 1 and 2 according to the invention with Comparison Example A shows quite clearly that not only is the half-value time considerably reduced, but that the surface resistance and limit charge are also lower.

Explanation of Table 1 and of the following tables (1) The surface resistance is measured in accordance with DIN 53482 or VDE 0303. Surface resistance and charge are each measured under the same conditions. The results indicate the resistance between two 10 cm.-long electrodes mounted 1 cm. apart.

(2) The moulded plastics disc to be measured is clamped down on a resilient support by means of a ring.

An arm covered with the rubbing "partner" rubs across the plate at a frequency of 1 c/s. Using a schwenkhagen field-intensity meter, the field intensity or strength betwen the specimen disc charged by rubbing and the measuring head, is measured and recorded. The rubbing "partners" consisted of fabrics near the positive or negative end of the triboelectric potential series, for example, fabrics of polycaprolactam or polyacrylonitrile.

In order to avoid errors in measurement which could be caused by the transfer of material from the rubbing partner to the plastics test specimen, a new specimen was used for each measurement.

Measurements were taken on:

(A) the magnitude of the charge after a fixed number of rubs (rubbing time 30 seconds), and
(B) the limiting charge or critical value towards which the charge tends on prolonged rubbing, and
(C) the time in which the charge is reduced by half at the end of rubbing (half-value time).

All the measurements are made after adequate conditioning in a conditioning cabinet. A specimen with known properties is used for comparison in each case.

EXAMPLE 3

4450 g. of a 39.7% latex of a graft ploymer of 22 parts of styrene and 8 parts of acrylonitrile on 70 parts of a copolymer of 30% butadiene, 69.5% butyl acrylate and 0.5% of divinyl benzene, are mixed with 8060 g. of a 43.4% latex of a copolymer of 72 parts of styrene and 28 parts of acrylonitrile with a K-value of 60.3 and 843 g. of a 30% emulsion of a linear polypropylene glycol with an average degree of polymerisation of 37±2 and an OH-number of 56±3. The ratio of graft polymer to resin to polyether is thus 30:70:5.

COMPARISON EXAMPLE B 4450 g. of the 33.7% graft polymer latex of Example 3 were mixed with 8060 g. of the 43.4% styrene/acrylonitrile copolymer latex of Example 3 in the absence of polyether. The latex mixture is worked up and further processed into circular discs as in Example 1. The electrical data measured on the circular discs are given in Table 2.

TABLE 2

| | Graft polymer component | Copolymer component | Polyether component | Surface resistance, Ω | Rubbing partner polycaprolactam | | Rubbing partner polyacrylonitrile | |
|---|---|---|---|---|---|---|---|---|
| | | | | | Limiting charge, v. cm.⁻¹ | Half-value time, secs. | Limiting charge, v. cm.⁻¹ | Half-value time, secs. |
| Example 3 | 30 | 70 | 5 | 2.10¹² | −1,400 | 3 | +100 | 7 |
| Comparison Example B | 30 | 70 | | >10¹⁴ | −5,200 | 2,800 | +4,700 | 2,100 |

NOTE.—Comparison of Example 3 according to the invention with Comparison Example 3 shows quite clearly that not only is the half-value time considerably reduced, but that the surfacr resistance and limit charge are also lower.

EXAMPLE 4

4490 g. of a 33.4% latex of a graft polymer of 14 parts of styrene and 6 parts of acrylonitrile on 80 parts of a copolymer of 50% butadiene and 50% butyl acrylate, are mixed with 8060 g. of a 43.4% latex of a copolymer of 72 parts of styrene and 28 parts of acrylonitrile with a K-value of 60.3 and 834 g. of a 30% emulsion of a linear polypropylene glycol with an average degree of polymerisation of 37±2 and an OH-number of 56±3. The ratio of graft polymer to resin to polypropylene glycol is thus 30:70:5. The mixture thus prepared is coagulated with 2% calcium chloride solution and the coagulate is separated off, washed free from salts and dried in vacuo at 70 to 80° C.

After it had been dried and then consolidated and homogenised on mixing rolls heated at 165° C., the material was granulated and injection moulded into circular discs on which the electrical data given in Table 3 were measured.

EXAMPLES 5, 6 AND 7

The electrical data given in Table 3 are obtained by replacing the linear polypropylene glycol of Example 4 with an average molecular weight of 37, by branched polypropylene glycols of the following composition:

| Example: | Degree of polymerisation | OH-number |
|---|---|---|
| 5 | 42 | 56 |
| 6 | 52 | 56 |
| 7 | 70 | 42 | and by further processing the polymer/polyether mixture as described in Example 4.

EXAMPLES 8 AND 9

The electrical data given in Table 3 are obtained by replacing the linear polypropylene glycol of Example 4 with an average degree of polymerisation of 37, by etherified or esterified linear polypropylene glycols of the following composition:

Example 8: polypropylene glycol monomethyl ether with an average degree of polymerisation of 36±2, and an OH-number of 28±2.

Example 9: polypropylene glycol diacetate with an average degree of polymerisation of 30±2 and an OH-number of approximately 0, and by further processing the polymer/polyether mixture as described in Example 4.

TABLE 3

| | Graft polymer component | Copolymer component | Degree of polymerisation | OH-No. | Polyether component | Surface resistance, $\Omega$ | Rubbing partner polycaprolactam | | Rubbing partner polyacrylonitrile | |
|---|---|---|---|---|---|---|---|---|---|---|
| | | | | | | | Limiting charge v. cm.$^{-1}$ | Half-value time, secs. | Limiting charge v. mc.$^{-1}$ | Half-value time, secs. |
| Example: | | | | | | | | | | |
| 4 | 30 | 70 | 37 | 56 | 5 | $5.10^{12}$ | −700 | 11 | +800 | 17 |
| 5 | 30 | 70 | 42 | 56 | 5 | $9.10^{12}$ | +500 | 87 | +1,200 | 64 |
| 6 | 30 | 70 | 52 | 56 | 5 | $9.10^{12}$ | −1,000 | 61 | +1,300 | 69 |
| 7 | 30 | 70 | 70 | 42 | 5 | $1.10^{13}$ | +700 | 72 | +1,600 | 58 |
| 8 | 30 | 70 | 36 | 28 | 5 | $8.10^{12}$ | −400 | 26 | +650 | 19 |
| 9 | 30 | 70 | 30 | 0 | 5 | $2.10^{13}$ | +600 | 83 | +1,190 | 98 |

EXAMPLE 10

6800 g. of a 33.1% latex of a graft polymer of 14 parts of styrene and 6 parts of acrylonitrile and 80 parts of a copolymer of 30% butadiene and 70% methyl methacrylate, are mixed with 6340 g. of a 43.4% latex of a copolymer of 72 parts of styrene and 28 parts of acrylonitrile with a K-value of 60.3, and 834 g. of a 30% emulsion of a linear polypropylene glycol with an average degree of polymerisation of 37±2 and an OH-number of 56±3. The ratio of graft polymer to resin to polypropylene glycol is thus 45:55:5. The polymer/polyether mixture was worked up and further processed as already repeatedly described. The electrical data measured on circular discs are given in Table 4.

EXAMPLE 11

4190 g. of a 33.4% latex of a graft polymer of 14 parts of styrene and 6 parts of acrylonitrile on 80 parts of a copolymer of 50% butadiene and 50% butyl acrylate, are mixed with 10,560 g. of a 34.1% latex of a graft polymer of 70 parts of α-methyl styrene and 30 parts of acrylonitrile with a K-value of 60.0, and 834 g. of a 30% emulsion of a linear polypropylene glycol with an average degree of polymerisation of 37±2 and an OH-number of 56±3, and the resulting mixture worked up as already repeatedly described. The ratio of graft polymer to resin to polypropylene glycol is thus 28:72:5. After it had been roll-mixed, granulated and injection-moulded, the resulting moulding composition showed the electrical data given in Table 4.

TABLE 4

| | Graft polymer component | Copolymer component | Polyether component | Surface resistance, $\Omega$ | Rubbing partner polycaprolactam | | Rubbing partner polyacrylonitrile | |
|---|---|---|---|---|---|---|---|---|
| | | | | | Limiting charge, v. cm.$^{-1}$ | Half-value time, secs. | Limiting charge, v. cm.$^{-1}$ | Half-value time, secs. |
| Example: | | | | | | | | |
| 10 | 45 | 55 | 5 | $1.10^{13}$ | −620 | 19 | +800 | 16 |
| 11 | 28 | 72 | 5 | $7.10^{12}$ | −600 | 30 | +850 | 18 |

EXAMPLE 12

2380 g. of a 31.45% latex of a graft polymer of 14 parts of styrene and 6 parts of acrylonitrile on 80 parts of a copolymer of 50% butadiene and 50% dibutyl fumarate, are mixed with 5400 g. of a 41.6% latex of a copolymer of 72 parts of styrene and 28 parts of acrylonitrile with a K-value of 60.0 and 500 g. of a 30% emulsion of a linear polypropylene glycol with an average degree of polymerisation of 37±2 and an OH-number of 56±3. The ratio of graft polymer to resin to polypropylene glycol is thus 25:75:5. The polymer/polyether mixture is worked up and further processed as already repeatedly described. The electrical data measured on the circular discs are given in Table 5.

TABLE 5

| | Graft polymer component | Copolymer component | Polyether component | Surface resistance, $\Omega$ | Rubbing partner polycaprolactam | | Rubbing partner polyacrylonitrile | |
|---|---|---|---|---|---|---|---|---|
| | | | | | Limiting charge, v. cm.$^{-1}$ | Half-value time, secs. | Limiting charge, v. cm.$^{-1}$ | Half-value time, secs. |
| Example: | | | | | | | | |
| 12 | 25 | 75 | 5 | $6.10^{12}$ | −610 | 10 | +410 | |

We claim:
1. An antistatic moulding composition comprising a mixture of:
 (A) 5 to 99% by weight of a graft copolymer prepared by the graft polymerization:
  (a) 10 to 95% by weight of a mixture of
   (1) 5 to 90% by weight of at least one monomer selected from the group consisting of styrene and polymerizable alkyl substituted derivatives thereof, and
   (2) 50 to 10% by weight of at least one monomer selected from the group consisting of acrylonitrile and polymerizable alkyl substituted derivatives thereof on
  (b) 90 to 5% by weight of a copolymer of:
   (1) 85 to 5% by weight of butadiene, isoprene or a mixture thereof, and
   (2) 15 to 95% by weight of an ester of an ethylenically unsaturated carboxylic acid and an alkanol, said alkanol containing from 1 to 10 carbon atoms and said ethylenically unsaturated carboxylic acid being acrylic acid, methacrylic acid or fumaric acid, and (B) 0 to 94% by weight of a thermoplastic copolymer of:
  (a) 50 to 95% by weight of at least one monomer selected from the group consisting of styrene and polymerizable alkyl substituted derivatives thereof, and
  (b) 50 to 5% by weight of at least one monomer selected from the group consisting of acrylonitrile and polymerizable alkyl substituted derivatives thereof, and (C) 1 to 10% by weight of a polypropylene glycol having a degree of polymerization from 5 to 1000, said polypropylene glycol being selected from the group consisting of polypropylene glycols having terminal OH— groups and partially and completely etherified and esterified polypropylene glycols wherein the etherifying alcohol is an alkanol containing from 1 to 20 carbon atoms and the esterifying acid is an alkanoic acid containing from 1 to 18 carbon atoms, the total quantity of acrylonitrile, styrene and the aforesaid alkyl substituted derivatives thereof present in components (A) and (B) comprising at least 50% by weight thereof.

2. An antistatic moulding composition comprising a mixture of:
(A) 5 to 60% by weight of a graft copolymer prepared by the graft polymerization of:
  (a) 10 to 80% by weight of a mixture of:
    (1) 50 to 90% by weight of at least one monomer selected from the group consisting of styrene and polymerizable alkyl substituted derivatives thereof, and
    (2) 50 to 10% by weight of at least one monomer selected from the group consisting of acrylonitrile and polymerizable alkyl substituted derivatives thereof on
  (b) 90 to 20% by weight of a copolymer of:
    (1) 85 to 15% by weight of butadiene, isoprene or a mixture thereof, and
    (2) 15 to 85% by weight of an ester of an ethylenically unsaturated carboxylic acid and an alkanol, said alkonol containing from 1 to 10 carbon atoms and said ethylenically unsaturated carboxylic acid being acrylic acid, methacrylic acid or fumaic acid, and (B) 10 to 92% by weight of a thermoplastic copolymer of:
  (a) 50 to 95% by weight of at least one monomer selected from the group consisting of styrene and polymerizable alkyl substituted derivatives thereof, and
  (b) 50 to 5% by weight of at least one monomer selected from the group consisting of acrylonitrile and polymerizable alkyl substituted deritives thereof, and (C) 1 to 10% by weight of a polypropylene glycol having a degree of polymerization from 5 to 1000, said polypropylene glycol being selected from the group consisting of polypropylene glycols having terminal OH— groups and partially and completely etherified and esterified polypropylene glycols wherein the etherifying alcohol is an alkanol containing from 1 to 20 carbon atoms and the esterifying acid is an alkanoic acid containing from 1 to 18 carbon atoms, the total quantity of acrylonitrile, styrene and the aforesaid alkyl substituted derivatives thereof present in components (A) and (B) comprising at least 50% by weight thereof.

3. The antistatic moulding composition of claim 1 wherein the conjugated diolefin of said graft copolymer is butadiene.

4. The antistatic moulding composition of claim 1 wherein said polypropylene glycol has a degree of polymerization of from 10 to 200.

5. An antistatic moulding composition comprising a mixture of:
(A) 5 to 99% by weight of a graft copolymer prepared by the graft polymerization of:
  (a) 10 to 95% by weight of a mixture of:
    (1) 50 to 90% by weight of styrene, and
    (2) 50 to 10% by weight of acrylonitrile on
  (b) 90 to 5% by weight of a copolymer of:
    (1) 85 to 5% by weight of butadiene, isoprene or a mixture thereof, and
    (2) 15 to 95% by weight of an ester of an ethylenically unsaturated carboxylic acid and an alkanol, said alkanol containing from 1 to 10 carbon atoms and said ethylenically unsaturated carboxylic acid being acrylic acid, methacrylic acid or fumaric acid, and (B) 0 to 94% by weight of a thermoplastic copolymer of:
  (a) 50 to 90% by weight of styrene, and
  (b) 50 to 5% by weight of acrylonitrile, and (C) 1 to 10% by weight of a polypropylene glycol having a degree of polymerization from 5 to 1000, said polypropylene glycol being selected from the group consisting of polypropylene glycols having terminal OH— groups and partially and completely etherified and esterified polypropylene glycols wherein the etherifying alcohol is an alkanol containing from 1 to 20 carbon atoms and the esterifying acid is an alkanoic acid containing from 1 to 18 carbon atoms, the total quantity of acrylonitrile and styrene present in components (A) and (B) comprising at least 50% by weight thereof.

6. The antistatic moulding composition of claim 5 wherein the polypropylene glycol has a degree of polymerization from 10 to 200.

7. The antistatic moulding composition of claim 5 wherein the conjugated diolefin of said graft copolymer is butadiene.

References Cited
UNITED STATES PATENTS 3,354,108    11/1967    Paradis et al.    260—31.4
3,450,794    6/1969    Ebneth et al.    260—876

JAMES A. SEIDLECK, Primary Examiner

U.S. Cl. X.R.

260—33.2, 880